W. H. Payne,
Grain Binder.
No. 105974. Patented Aug. 2, 1870.
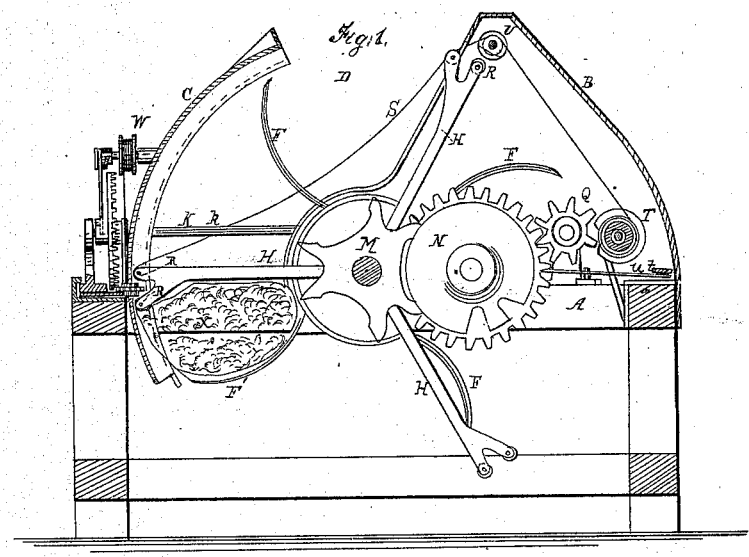
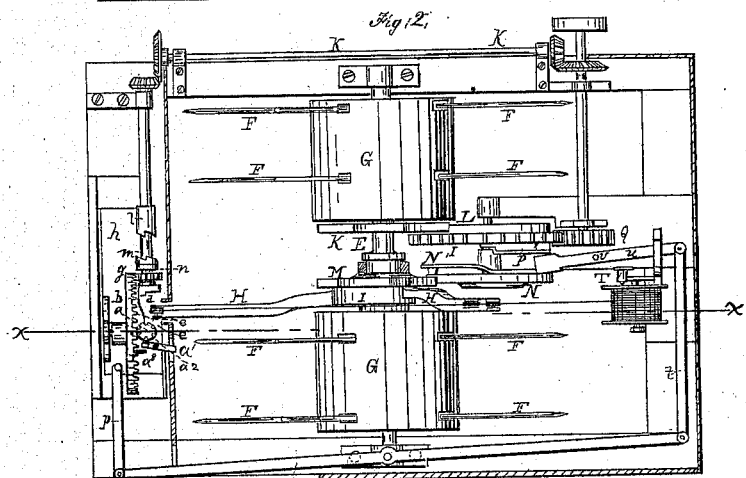
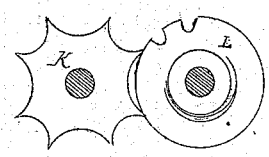
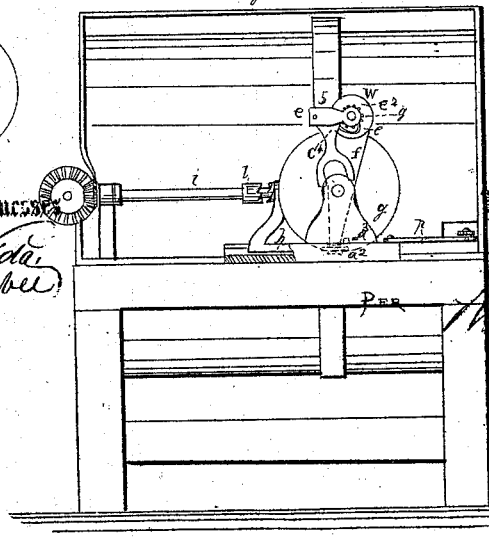
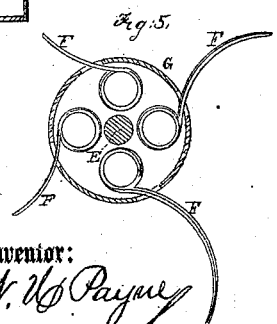
Witnesses:
Chas. Nida
L. S. Mabee
Inventor:
W. H. Payne
per Attorneys.

UNITED STATES PATENT OFFICE.

WILLIAM H. PAYNE, OF JANESVILLE, WISCONSIN.

IMPROVEMENT IN GRAIN-BINDERS.

Specification forming part of Letters Patent No. 105,974, dated August 2, 1870.

*To all whom it may concern:*

Be it known that I, WM. H. PAYNE, of Janesville, in the county of Rock and State of Wisconsin, have invented a new and Improved Grain-Binder; and I do hereby declare that the following is a full, clear, and exact description thereof, which will enable others skilled in the art to make and use the same, reference being had to the accompanying drawings forming part of this specification.

This invention relates to improvements in machines for attachment to harvesters, for the purpose of receiving the grain from the apron, separating it into gavels, and binding the same. And the invention consists in the combination and arrangement of parts as hereinafter fully described, and as particularly specified in the claim.

Figure 1 is a sectional elevation of my improved machine, taken on the line $x\,x$ of Fig. 2. Fig. 2 is a plan view of the working parts, the shields being sectioned. Fig. 3 is an end elevation; and Figs. 4 and 5 are views of certain parts in detail.

A is a frame for supporting the working parts, and intended to be adapted for connection to any harvester, having an apron for the reception of the falling grain. It is provided with two shields, B C, for controlling the grain and protecting the working parts, between which shields is an opening, D, at the top, extending across the machine, in which the grain is to be dropped by an endless apron, or other means for conveying it from the apron of the harvester thereto. Below this opening and parallel with it, is a revolving shaft, E, carrying two or more sets of curved receiving-arms, F, rigidly attached to it. H represents separating and compressing arms, of which there may be two or more, connected to a hub, I, mounted loosely on the shaft E, so as to turn independently of it. The shaft E is provided with a star-wheel, K, which gears with a notched disk on a counter-shaft, by which it may be turned a quarter of a revolution at a time, and held in the required position between each movement. The hub I is also provided with a star-wheel, M, gearing with a similar notched disk, N, on the same counter-shaft O, and also to hold it in position between each movement. This shaft has a large toothed wheel, P, in which a small pinion, Q, gears, and imparts constant motion to it. The said pinion may be caused to revolve by any suitable connection with a constantly-revolving part of the harvester. The ends of these compressing-arms H are forked, and the end of each member of the fork is provided with a guide-roller, R.

When at rest, one set of arms, F, stand in the right position relatively to the opening D between the shields for the reception of the grain, and one of the arms H stands at the opposite side of the said opening, as clearly shown in Fig. 1, while the binding-wire S is stretched across the said opening from the reel T over the guide-roll U, and the guide-roll R, in the front member of the crotch, to a passage through the bottom of the shield C up to the reel W. When the notches of the disks L arrive, in their due course, to act on the star-wheel K, the arms which have received the grain are turned down to the position represented in Fig. 1 at F', slightly below the twisting apparatus, and, at the same time, or immediately afterward, the compressing-arm moves and stops opposite the twisting devices above the folding arms also, as shown in Fig. 1, and in doing so it separates the grain in the receiving-arms from that succeeding and compresses it into the gavel X. At the same time it carries the wire over the gavel and holds it to be taken by the twisting-wheel $a$ in one of its notches through the notch $d$ in the bearing-plate $e$, which supports the twisting-wheel, which already holds the other part of the bight of the wire in one of its notches, the same hanging from the reel W in the oblique line $f$ so as to be drawn through the notch $d$ by the tension it is under, caused by the compression of the gavel. The part of the wire stretching between the two members of the fork of the arm is caused to pass into one of the notches of the twisting-wheel by the sliding of the wheel, together with its driver $g$, toward it. These wheels are mounted on a sliding plate, $h$, which also supports the end of the driving-shaft $i$, gearing with the constantly-moving shaft K, connected with the shaft of the pinion Q so as to move in unison with it. This shaft $i$ carries a fixed clutch, $l^2$, and a loose clutch, $m$, and pinion, $n$, connected to it. This pinion gears with the wheel $g$, and is arranged, with its support, on the plate $h$ so that it will slide on the shaft with the wheel $g$ to and from the fixed clutch $l$, which imparts motion to the pinion when gearing with it, and thereby revolves the wheel $g$ and the twisting-wheel $a$, which has long teeth at its center gearing with $g$. The slide $h$ is connected by a link, $p$, with the lever $q$, pivoted at $v$, and connected by a link, $t$, to a vibrator, $u$, pivoted at $v$, and projecting, at its free end, between the disk N and the wheel P, which have cam-plates N' P' for moving the vibrator back and forth. The cam N' is so arranged that, as soon as the compressing-arm has stopped in front of the twister, it will throw the vibrator and the slide $h$ forward to connect the clutches $m$ $l$ together, and the twisting-wheel and its notched support forward to receive the wire that is stretched between the two parts of the fork. This wire will not be received in the same notch that holds the other, for the tension of that wire, drawing in the oblique direction it does while the wheels are disengaged from the fixed clutch, will cause the twisting-wheel to turn a half revolution, so that the last wire will be received opposite the first. The twisting-wheel being set in motion at the same time, it receives the last wire, twists them together both above and below it, the knot below securing the bundle, and the one above uniting the wires for the next band. It will be seen that the wire S is, each time, carried into the groove in the casing C, and thus into contact with the twisting-wheel by means of the forks of the arms H.

$a^1$ is a cutter pivoted to the plate $h$, and having a shank, $a^2$, arranged to be struck by a cam, $a^3$, on the wheel $g$, and be moved across the upper face of the twister to cut the wires. The bundle is then free to be discharged by the next movement of the shaft E, which brings down the next set of holding-arms and a gavel with them. The return movement of the slide $h$ is caused by the cam-plate P' acting on the vibrator V, or the action of moving the clutches together may be caused by a star-wheel and cam at the end of the shaft $i$. The next gavel coming down draws the part of the wire suspended from the reel W into the twisting-wheel; but previous to this, the said wire is either let out or taken up to carry the knot away from the twister. In this instance it is taken up, which is effected by a ratchet-wheel, $e^2$, on the shaft of the reel W, a spring-pawl, $e^3$, being connected to an arm, $e^4$, pivoted at $e^1$ and connected to the shaft of the wheel $g$, so as to be vibrated by it in moving back and forth. By reversing the pawl the reel may be turned in the opposite direction, and the wire let out so that the knot will pass down below the twister, or the same may be effective by winding the wire off the reel in the opposite direction. This pawl also produces the requisite tension on the ratchet-wheel $e^2$ to hold the wire. The tension is produced on the other reel T by means of a spring-pressure pin, T'.

I do not claim, broadly, binding grain in a binding-machine by means of two wires coming from opposite directions or different spools; but

Having thus described my invention, I claim as new and desire to secure by Letters Patent—

1. The compressing and receiving or carrying arms, in combination with the star-wheels and notched disks, substantially as herein shown and described.

2. The combination of the cam-wheels N P and the slide $h$, gear-wheel $g$, and twister $a$, when connected by rods or bars, so as to operate substantially as specified.

3. The combination of the ratchet-wheel $e^2$, spring-pawl $e^3$, and arm $e^4$, with the wheel $g$ and slide $h$, substantially as and for the purpose specified.

4. The combination of the twister $a$ with the wheel $g$, slide $h$, and forked compressor-arms H, arranged and operating substantially as shown and described.

5. The arrangement of the knife $a^1$, step $a^3$, slide $h$, and twisting-pinion $a$, as shown and described.

6. The combination of the receiving-arms F, compressors H, reels T W, star-wheels K M, notched disks L N, clutch M, wheel $g$, slide $h$, twister $a$, connecting-bars $p$ $q$ $t$ $u$, cam-wheels N P, pinion Q, arranged and operating substantially as specified.

WM. H. PAYNE.

Witnesses:
   G. W. KIMBALL,
   A. D. STODDARD.